United States Patent
Agarwal et al.

(10) Patent No.: US 11,454,949 B2
(45) Date of Patent: Sep. 27, 2022

(54) AUTO-CORRELATION OF WAFER CHARACTERIZATION DATA AND GENERATION OF COMPOSITE WAFER METRICS DURING SEMICONDUCTOR DEVICE FABRICATION

(71) Applicant: KLA-Tencor Corporation, Milpitas, CA (US)

(72) Inventors: Shivam Agarwal, Milpitas, CA (US); Hariharasudhan Koteeswaran, Chennai (IN); Priyank Jain, Sunnyvale, CA (US); Suvi Murugan, Chennai (IN); Yuan Zhong, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 74 days.

(21) Appl. No.: 16/254,951

(22) Filed: Jan. 23, 2019

(65) Prior Publication Data
US 2019/0302734 A1    Oct. 3, 2019

Related U.S. Application Data

(60) Provisional application No. 62/728,712, filed on Sep. 7, 2018.

(30) Foreign Application Priority Data

Mar. 28, 2018   (IN) .............................. 201841011799

(51) Int. Cl.
G05B 19/4097     (2006.01)
G05B 13/02       (2006.01)

(52) U.S. Cl.
CPC ..... G05B 19/4097 (2013.01); G05B 13/0265 (2013.01); *G05B 2219/45031* (2013.01)

(58) Field of Classification Search
None
See application file for complete search history.

(56) References Cited

U.S. PATENT DOCUMENTS 5,240,866 A  *  8/1993  Friedman ............... H01L 22/20
                                                  702/35
2002/0062162 A1   5/2002  Bunkofske et al.
(Continued)

FOREIGN PATENT DOCUMENTS

JP       2014150170 A      8/2014

OTHER PUBLICATIONS

Meptis, Application Specific Integrated Circuit, Aug. 2, 2014, <https://www.mepits.com/tutorial/169/vlsi/application-specific-integrated-circuit> (Year: 2014).*
(Continued)

*Primary Examiner* — Kenneth M Lo
*Assistant Examiner* — Istiaque Ahmed
(74) *Attorney, Agent, or Firm* — Suiter Swantz pc llo

(57) ABSTRACT

A system includes a controller with processors configured to execute an auto-correlation module embodied in one or more sets of program instructions stored in memory. The auto-correlation module is configured to cause the processors to receive one or more patterned wafer geometry metrics, receive wafer characterization data from one or more characterization tools, determine a correlation between the one or more patterned wafer geometry metrics and the wafer characterization data, generate a ranking of the one or more patterned wafer geometry metrics based on the determined correlation, construct a composite metric model from a subset of the one or more patterned wafer geometry metrics based on the ranking of the one or more patterned wafer geometry metrics, generate one or more composite wafer metrics from the composite metric model, and gen- (Continued)

erate a statistical process control output based on the one or more composite wafer metrics.

37 Claims, 9 Drawing Sheets

(56) References Cited

U.S. PATENT DOCUMENTS

| | | | | |
|---|---|---|---|---|
| 2007/0052963 | A1* | 3/2007 | Orbon | G03F 1/84 |
| | | | | 356/430 |
| 2015/0302312 | A1 | 10/2015 | Vukkadala et al. | |
| 2016/0148850 | A1* | 5/2016 | David | G06N 7/005 |
| | | | | 438/5 |
| 2016/0163033 | A1* | 6/2016 | Vukkadala | H01L 22/12 |
| | | | | 382/145 |
| 2016/0371423 | A1* | 12/2016 | Vukkadala | G06F 30/39 |
| 2017/0017162 | A1 | 1/2017 | Chang et al. | |
| 2017/0194125 | A1* | 7/2017 | Kris | H01J 37/28 |
| 2018/0144078 | A1* | 5/2018 | Morvay | G03F 7/70875 |
| 2018/0315670 | A1* | 11/2018 | Yati | H01L 22/20 |

OTHER PUBLICATIONS

International Search Report dated Jul. 8, 2019 for PCT/US2019/024156.

* cited by examiner

AUTO-CORRELATION OF WAFER CHARACTERIZATION DATA AND GENERATION OF COMPOSITE WAFER METRICS DURING SEMICONDUCTOR DEVICE FABRICATION

CROSS-REFERENCE TO RELATED APPLICATIONS

The present application claims priority to India Provisional Patent Application No. 201841011799, filed Mar. 28, 2018, titled COMPOSITE METRIC BASED AUTO-CORRELATION OF PWG AND PROCESS DATA, naming Shivam Agarwal, Hariharasudhan Koteeswaran, Priyank Jain, Suvi Murugan, and Yuan Zhong as inventors.

The present application claims priority to U.S. Provisional Patent Application Ser. No. 62/728,712, filed Sep. 7, 2018, titled COMPOSITE METRIC BASED AUTO-CORRELATION OF PWG AND PROCESS DATA, naming Shivam Agarwal, Hariharasudhan Koteeswaran, Priyank Jain, Suvi Murugan, and Yuan Zhong as inventors.

India Provisional Patent Application No. 201841011799 and U.S. Provisional Patent Application No. 62/728,712 are incorporated herein by reference in their entirety.

TECHNICAL FIELD

The present invention generally relates to semiconductor device fabrication and, more particularly, to auto-correlation of wafer characterization data and generation of composite wafer metrics during semiconductor device fabrication.

BACKGROUND

The fabrication of semiconductor devices, such as logic and memory devices, typically includes processing a semiconductor device using a number of fabrication processes and characterization processes to form various features and multiple layers of the semiconductor device. Select fabrication processes utilize photomasks/reticles to print features on a semiconductor device such as a wafer. As semiconductor devices become smaller and smaller laterally and extended vertically, it becomes critical to develop enhanced characterization processes with increased sensitivity and throughput.

Process-induced wafer geometry (PIWG) distortion in semiconductor device dies often results in the semiconductor device failing electrical tests during final electrical probe or end probe testing. Select pattern wafer geometry (PWG) tools quantify and monitor wafer geometry distortion during fabrication by correlating semiconductor device die failure with a geometry feature corresponding to a selected geometry metric. The selected geometry metric may be one geometry metric of the hundreds of geometry metrics for characterizing wafer geometry (or a subset of the hundreds of geometry metrics, selected based on semiconductor manufacturers' judgment and the end probe testing failure data). Once the geometry metric of the hundreds of geometry metrics (or subset thereof) with the select level of correlation is determined, the remainder of the geometry metrics may be discarded.

The select PWG tools may determine the root cause of the semiconductor device die failure to be the particular geometry feature corresponding to the geometry metric with a select level of correlation to the semiconductor device die failure. The select level of correlation, however, is generally limited to the correlation for a single geometry metric of the hundreds of geometry metrics, meaning the select level of correlation may be limited by the representation of the single geometry metric. For example, the select level of correlation may be less than 70 percent.

As a result, the select level of correlation may imply a weak causal relation of the geometry feature and the semiconductor device die failure. In addition, individually checking each geometry metric of the hundreds of geometry metrics (or even the subset of the hundreds of geometry metrics) may require a high turnaround time on the order of several days to weeks. Turnaround time may be increased with the possibility that multiple semiconductor process steps may be the root cause of the semiconductor device die failure, as the selected geometry metric may need to meet the select level of correlation at all possible process steps. In addition, turnaround time may be increased with the possibility that the selected geometry metric corresponds to multiple wafer geometry frequencies, as the selected geometry metric may need to meet the select level of correlation for all wafer geometry frequencies.

Therefore, it would be advantageous to provide a system and method that cures the shortcomings described above.

SUMMARY

A system is disclosed, in accordance with one or more embodiments of the present disclosure. In one embodiment, the system includes a controller. In another embodiment, the controller includes one or more processors and memory configured to store one or more sets of program instructions. In another embodiment, the one or more processors are configured to execute an auto-correlation module embodied in the one or more sets of program instructions. In another embodiment, the auto-correlation module is configured to cause the one or more processors to receive one or more patterned wafer geometry metrics. In another embodiment, the auto-correlation module is configured to cause the one or more processors to receive wafer characterization data from one or more characterization tools. In another embodiment, the auto-correlation module is configured to cause the one or more processors to determine a correlation between the one or more patterned wafer geometry metrics and the wafer characterization data. In another embodiment, the auto-correlation module is configured to cause the one or more processors to generate a ranking of the one or more patterned wafer geometry metrics based on the determined correlation. In another embodiment, the auto-correlation module is configured to cause the one or more processors to construct a composite metric model from a subset of the one or more patterned wafer geometry metrics based on the ranking of the one or more patterned wafer geometry metrics. In another embodiment, the auto-correlation module is configured to cause the one or more processors to generate one or more composite wafer metrics from the composite metric model. In another embodiment, the auto-correlation module is configured to cause the one or more processors to generate a statistical process control output based on the one or more composite wafer metrics.

A system is disclosed, in accordance with one or more embodiments of the present disclosure. In one embodiment, the system includes one or more characterization tools. In another embodiment, the system includes a controller. In another embodiment, the controller includes one or more processors and memory configured to store one or more sets of program instructions. In another embodiment, the one or more processors are configured to execute an auto-correlation module embodied in the one or more sets of program instructions. In another embodiment, the auto-correlation module is configured to cause the one or more processors to receive one or more patterned wafer geometry metrics. In another embodiment, the auto-correlation module is configured to cause the one or more processors to receive wafer characterization data from the one or more characterization tools. In another embodiment, the auto-correlation module is configured to cause the one or more processors to determine a correlation between the one or more patterned wafer geometry metrics and the wafer characterization data. In another embodiment, the auto-correlation module is configured to cause the one or more processors to generate a ranking of the one or more patterned wafer geometry metrics based on the determined correlation. In another embodiment, the auto-correlation module is configured to cause the one or more processors to construct a composite metric model from a subset of the one or more patterned wafer geometry metrics based on the ranking of the one or more patterned wafer geometry metrics. In another embodiment, the auto-correlation module is configured to cause the one or more processors to generate one or more composite wafer metrics from the composite metric model. In another embodiment, the auto-correlation module is configured to cause the one or more processors to generate a statistical process control output based on the one or more composite wafer metrics.

A method is disclosed, in accordance with one or more embodiments of the present disclosure. In one embodiment, the method may include, but is not limited to, receiving one or more patterned wafer geometry metrics. In another embodiment, the method may include, but is not limited to, receiving wafer characterization data from one or more wafer characterization tools. In another embodiment, the method may include, but is not limited to, determining a correlation between the one or more patterned wafer geometry metrics and the wafer characterization data. In another embodiment, the method may include, but is not limited to, generating a ranking of the one or more patterned wafer geometry metrics based on the determined correlation. In another embodiment, the method may include, but is not limited to, constructing a composite metric model from a subset of the one or more patterned wafer geometry metrics based on the ranking of the one or more patterned wafer geometry metrics. In another embodiment, the method may include, but is not limited to, generating one or more composite wafer metrics from the composite metric model. In another embodiment, the method may include, but is not limited to, generating a statistical process control output based on the one or more composite wafer metrics.

BRIEF DESCRIPTION OF THE DRAWINGS

The numerous advantages of the present disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1-7, a system and method for auto-correlation of wafer characterization data and generation of composite wafer metrics during semiconductor device fabrication is disclosed, in accordance with one or more embodiments of the present disclosure.

Embodiments of the present disclosure are directed to auto-correlation of wafer characterization data and generation of composite wafer metrics during semiconductor device fabrication. Embodiments of the present disclosure are also directed to classification processes for metric ranking-based auto-correlation. Embodiments of the present disclosure are also directed to generating composite metrics for greater correlation between semiconductor device die failure and geometry features. Embodiments of the present disclosure are also directed to implementing the generated rankings and composite metrics for end probe and inline semiconductor characterization processes.

It is noted herein that "geometry metric," "wafer geometry metric," "pattern wafer geometry metric," and "PWG metric" are equivalent for purposes of the present disclosure. In addition, it is noted herein that "geometry feature," "wafer geometry feature," "pattern wafer geometry feature," and "PWG feature" are equivalent for purposes of the present disclosure.

FIGS. 1-4 generally illustrate methods for auto-correlation of wafer characterization data and generation of composite wafer metrics during semiconductor device fabrication, in accordance with one or more embodiments of the present disclosure.

Figure 1:
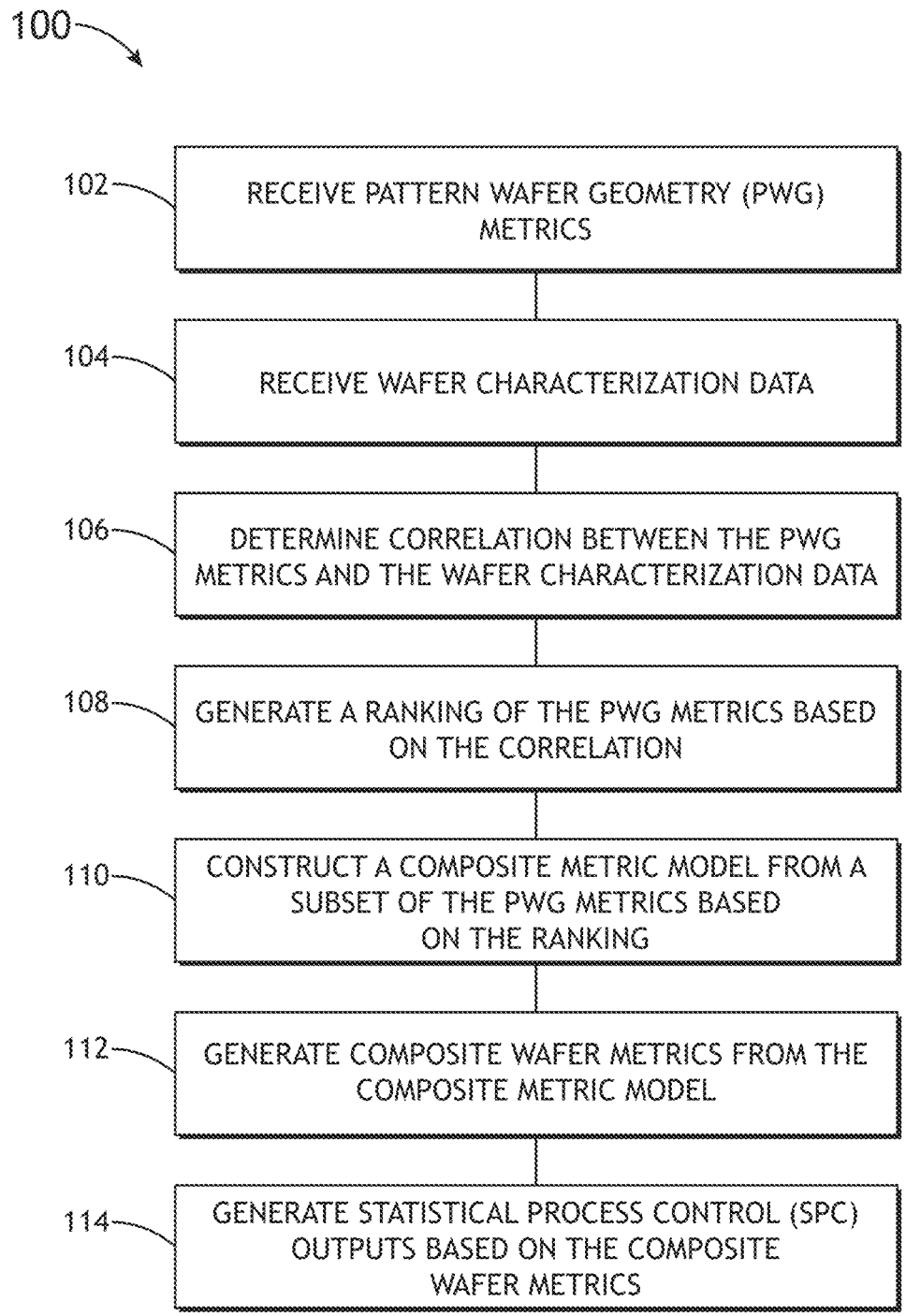
FIG. 1 illustrates a flow diagram of a method for auto-correlation of wafer characterization data and generation of composite wafer metrics, in accordance with one or more embodiments of the present disclosure.

FIG. 1 illustrates a method 100 for auto-correlation of wafer characterization data and generation of composite wafer metrics, in accordance with one or more embodiments of the present disclosure.

In a step 102, one or more pattern wafer geometry metrics (PWG metrics) are received. In one embodiment, the one or more PWG metrics each explain a portion of a semiconductor device (e.g., semiconductor wafer) die failure for a particular frequency of a geometry feature. For example, the one or more PWG metrics may include, but are not limited to, one or more wafer shape metrics (e.g., bow, warp, or the like), one or more site flatness metrics, one or more nanotopography metrics (NT metrics), one more roughness metrics, or the like. For example, an NT metric may be calculated for a front surface and a back surface of a wafer individually and correspond to sudden topography variations. By way of another example, the one or more PWG metrics may include one or more local shape curvature metrics (LSC metrics). For instance, an LSC metric may correspond to within-die (e.g., site-level) stress variation, or the like. It is noted herein the one or more PWG metrics may be classified based on spatial wavelength (e.g., ranging from micrometers to hundreds of millimeters) and amplitude/height (e.g., ranging from Angstroms to hundreds of micrometers). It is noted herein that the portions of the semiconductor device die failure explained by the one or more PWG metrics may or may not add up to a 100% combination or representation of the semiconductor device die failure.

In a step 104, wafer characterization data is received. In one embodiment, the wafer characterization data includes inspection data (e.g., in-plane distortion (IPD) data). In another embodiment, the wafer characterization data includes metrology data (e.g., out-of-plane distortion (OPD) data). For example, the wafer characterization data may include, but is not limited to, inline metrology data. In another embodiment, the wafer characterization data includes electrical probe or end probe data. In another embodiment, the wafer characterization data may be real-time data for a current set of semiconductor characterization processes. It is noted herein, however, that the wafer characterization data may be historical data for a previously-completed set of semiconductor characterization processes. Therefore, the above description should not be interpreted as a limitation on the scope of the present disclosure, but merely an illustration.

In a step 106, a correlation between the one or more PWG metrics and the wafer characterization data is determined. In one embodiment, the one or more PWG metrics and the wafer characterization data is input into a machine learning algorithm. For example, the machine learning algorithm may include a classification algorithm. For instance, the classification algorithm may include a logistic regression algorithm. In addition, the classification algorithm may include a decision tree.

In another embodiment, the machine learning algorithm includes one or more established algorithms. For example, the machine learning algorithm may include a weighted-sum model algorithm to determine the total performance of an alternative $A_i$ of a set of alternatives A, as shown in EQ. 1.

$$A_i = \Sigma_{j=1}^{n} w_j * a_{ij} \quad (\text{EQ. 1})$$

In EQ. 1, $A_i$ is a particular alternative of an m number of alternatives and an n number of decision criteria, where i ranges from 1 to m. In addition, $w_j$ is a weight of importance for a criterion $C_j$. Further, $a_{ij}$ is a performance value (e.g., PWG metric) for $A_i$, where $A_i$ is evaluated in terms of all criterion $C_j$ simultaneously.

In a step 108, a ranking of the PWG metrics is generated based on the correlation. In one embodiment, the ranking process assists in identifying one or more root causes of semiconductor device die failure. In one embodiment, the ranking is based on the correlation between the one or more PWG metrics to the semiconductor device die failure. For example, the ranking may be based on a correlation at the electrical probe or end probe. By way of another example, the ranking may be based on a correlation at any inline failure indicator (e.g., inspection tool, metrology tool, inline metrology tool, or the like) known in the art. For instance, the inline failure indicator known in the art may include, but is not limited to, metrology, overlay, Real-time Defect Analysis (RDA), or the like.

Figure 2:
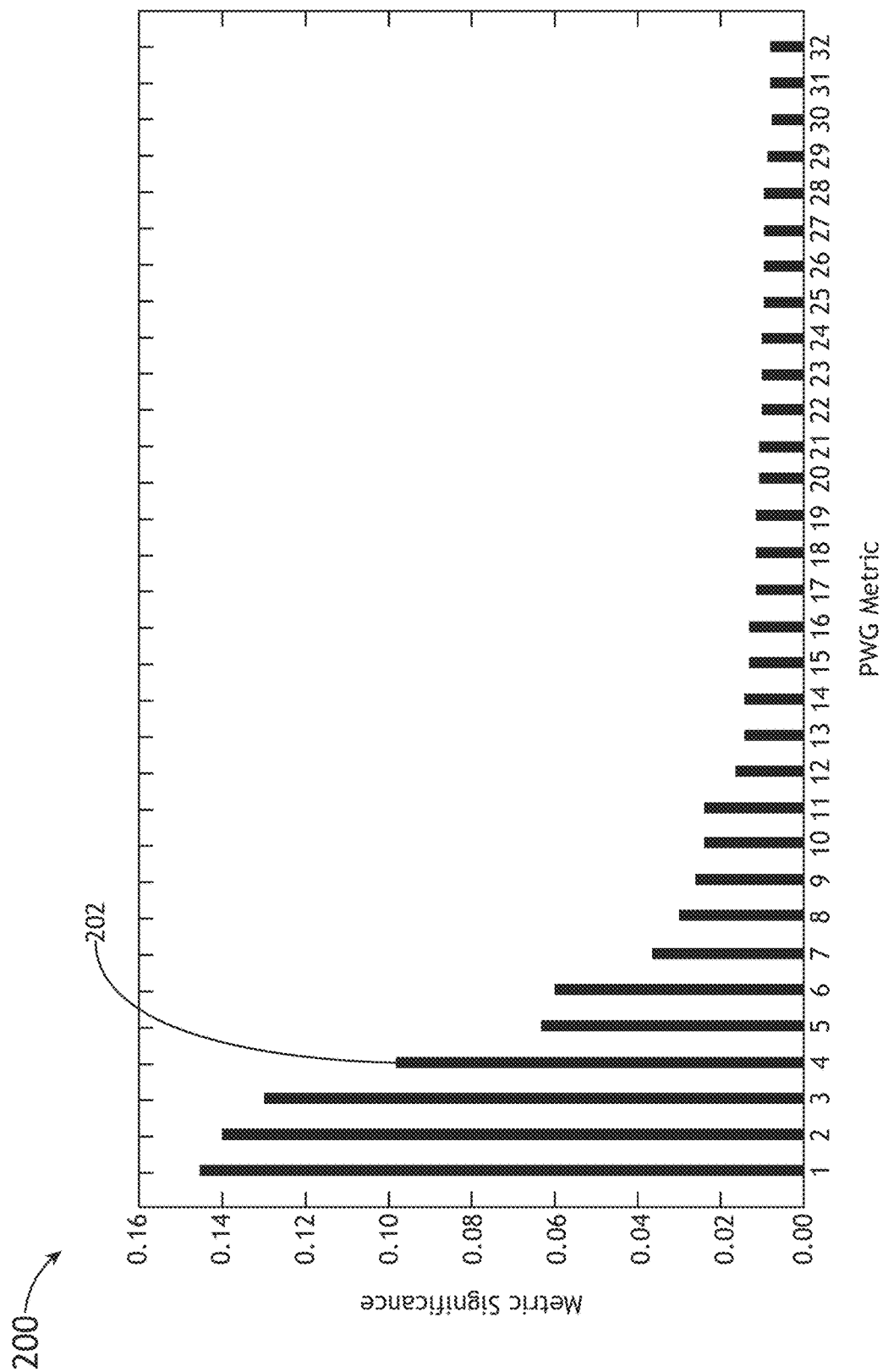
FIG. 2 graphically illustrates metric rankings based on metric significance versus pattern wafer geometry metrics, in accordance with one or more embodiments of the present disclosure.

In another embodiment, the machine learning algorithm ranks the one or more PWG metrics based on a determined correlation coefficient (or weighting coefficient, or metric significance). For example, the correlation coefficient may be an $R^2$—value. FIG. 2 graphically illustrates data 200 of a comparison of geometry metric significance versus pattern wafer geometry metrics for geometry metric rankings 202, in accordance with one or more embodiments of the present disclosure.

In another embodiment, the weight given to a particular PWG metric during the ranking of the one or more PWG metrics is proportional to the correlation coefficient for the particular PWG metric. For example, a first PWG metric with a first correlation coefficient that explains more about the semiconductor device die failure may be weighted more than a second PWG metric with a second correlation coefficient that explains less about the semiconductor device die failure. This increased weighting may cause the first PWG metric to be ranked more highly than the second PWG metric. It is noted herein, however, that the proportionality between the correlation coefficient and the weight given for purposes of ranking the one or more PWG metrics may be dependent on a case-by-case basis (e.g., dependent upon a particular set of the one or more PWG metrics at hand).

It is noted herein the machine learning algorithm may receive wafer characterization data and one or more PWG metrics for each semiconductor device die in a data sheet. For example, the data sheet may include row data for each semiconductor device die. By way of another example, the data sheet may include column data for PWG coordinates, wafer characterization data (e.g., inspection data, metrology data, inline metrology data, and/or electrical probe or end probe data), and PWG metrics. The machine learning algorithm may output a data set or chart including the rankings in response to the received wafer characterization data and the one or more PWG metrics for each semiconductor device die.

In a step 110, a composite metric model is constructed from a subset of the PWG metrics based on the ranking. In one embodiment, the machine learning algorithm generates the composite metric model from the one or more received PWG metrics and the wafer characterization data. In another embodiment, the composite metric model includes a subset of the one or more PWG metrics, where the subset of the one or more PWG metrics includes one or more select individual PWG metrics. For example, the subset of the one or more PWG metrics may include the highest-ranked individual PWG metrics. For instance, the composite metric model is constructed from a first metric with the highest ranking, a second metric with the second-highest ranking, to an Nth metric with the Nth-highest ranking. It is noted herein the subset of the one or more PWG metrics may include fewer than the entire set of the one or more PWG metrics.

In a step 112, one or more composite wafer metrics are generated from the composite metric model. In one embodiment, the composite metrics assist in determining causality between geometry features and semiconductor device die failure due to one or more factors and/or one or more fabrication processes. For example, the one or more composite wafer metrics may provide manufacturers of semiconductor devices a percentage of confidence that a particular semiconductor device being tested will pass or fail (e.g., as opposed to telling whether the device will pass or fail).

Figure 3B:
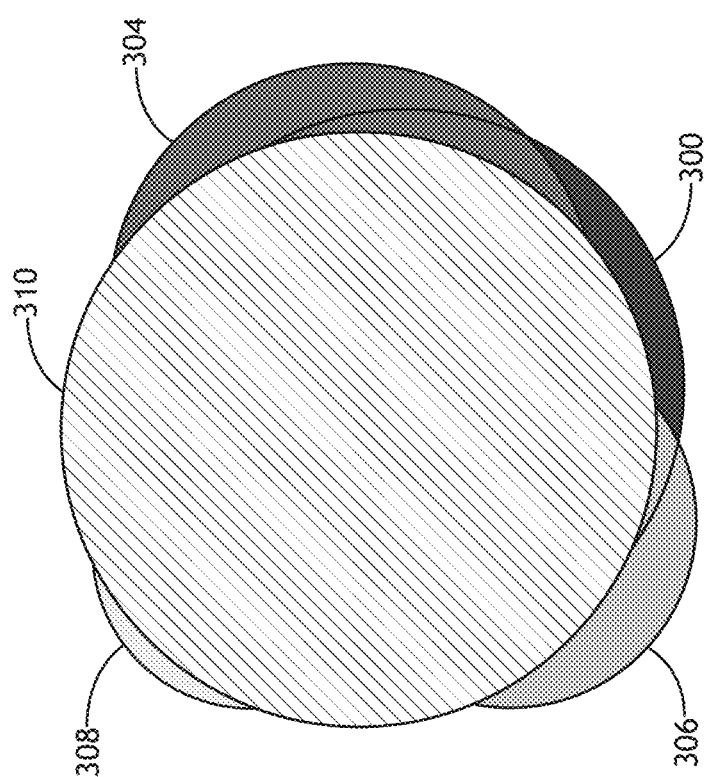
FIG. 3B graphically illustrates a composite PWG metric representing a semiconductor device die failure, in accordance with one or more embodiments of the present disclosure.
Figure 3A:
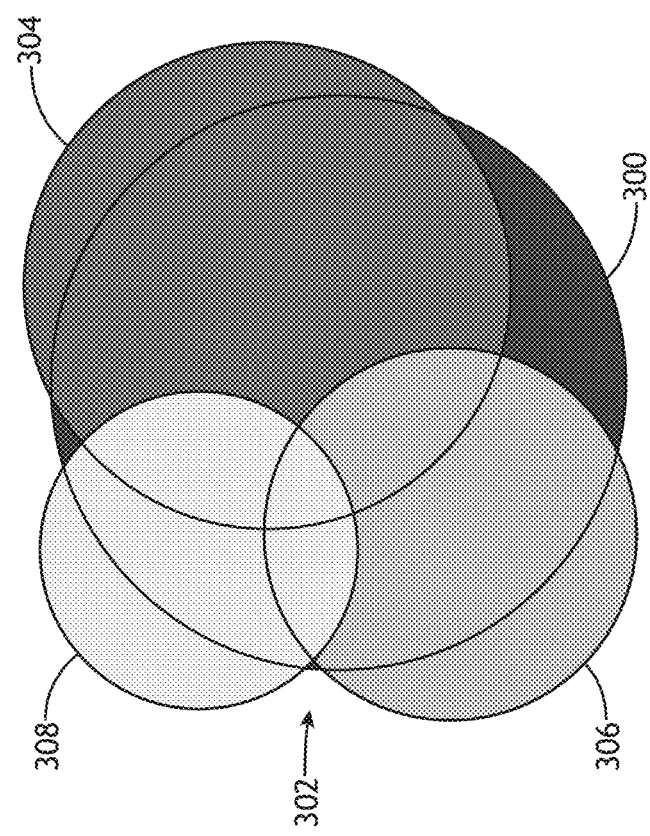
FIG. 3A graphically illustrates individual pattern wafer geometry (PWG) metrics representing a semiconductor device die failure, in accordance with one or more embodiments of the present disclosure.

FIG. 3A graphically illustrates a device die failure or die failure 300 at least partially represented by a subset 302 of PWG metrics, in accordance with one or more embodiments of the present disclosure. In one embodiment, the subset 300 of PWG metrics includes a PWG metric 304, a PWG metric 306, and a PWG metric 308, where the PWG metrics 304, 306, 308 can each explain a part of the die failure 300 for a particular frequency of a geometry feature. For example, the PWG metric 304 may have a 55% correlation to the die failure 300. By way of another example, the PWG metric 306 may have a 45% correlation to the die failure 300. By way of another example, the PWG metric 308 may have a 30% correlation to the die failure 300. In this regard, the PWG metrics 304, 306, 308 may each individually have a weak correlation to the die failure 300.

FIG. 3B graphically illustrates of the die failure 300 at least partially represented by a composite metric 310, in accordance with one or more embodiments of the present disclosure. In one embodiment, the composite metric model outputs the composite metric 310. For example, the composite metric 310 may have an 85% correlation to the die failure 300. In this regard, the composite metric 310 may have a stronger correlation to the die failure 300, as compared to the correlation of the PWG metrics 304, 306, 308 individually.

Figure 3C:
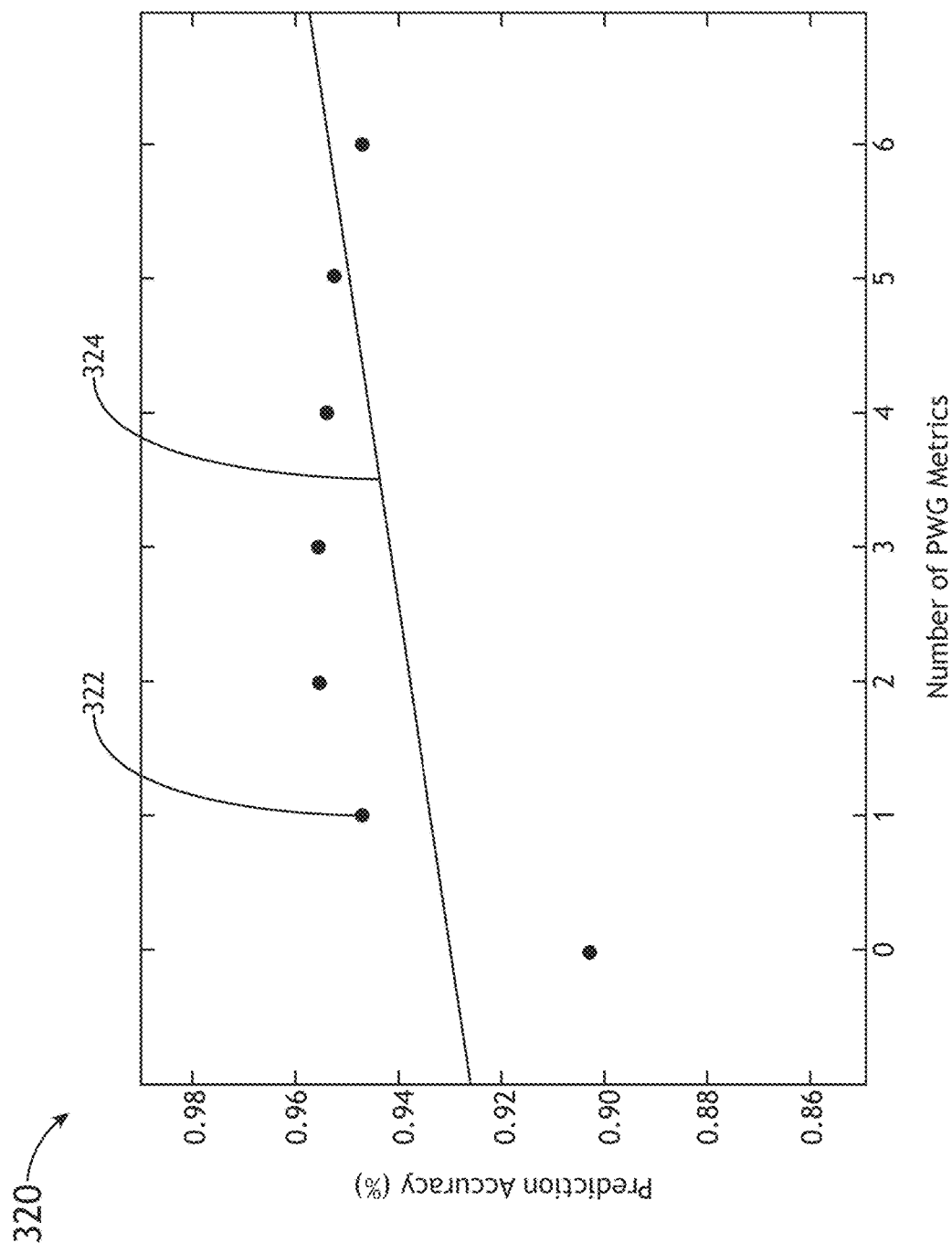
FIG. 3C graphically illustrates prediction accuracy of a metric ranking versus a number of metrics, in accordance with one or more embodiments of the present disclosure.

FIG. 3C graphically illustrates data 320 of a comparison of prediction accuracy versus number of geometry metrics for a composite wafer metric, in accordance with one or more embodiments of the present disclosure. As illustrated by the data points 322 and corresponding trend line 324, the prediction accuracy of the composite wafer metric may peak (e.g., provide an optimum correlation coefficient) with the inclusion of three geometry metrics. It is contemplated that the correlation coefficient may become saturated with more complicated composite wafer models including more than three geometry metrics. It is noted herein, however, that one may still use any number of geometry metrics to generate the composite wafer metrics.

In a step 114, one or more statistical process control (SPC) outputs are generated based on the one or more composite wafer metrics. In one embodiment, the SPC outputs are monitored for process control. In another embodiment, one or more control signals for one or more process tools are generated based on the one or more composite wafer metrics and/or the one or more SPC outputs. In another embodiment, the one or more control signals are provided to the one or more process tools.

It is noted herein that method 100 may allow for an automatic correlation (or auto-correlation) between a multitude of PWG metrics (e.g., tens, hundreds, or the like) and end probe wafer characterization data for semiconductor device die failure. For example, the automatic correlation may reduce the characterization timespan from weeks to days for manufacturers of semiconductor devices and/or semiconductor device fabrication tools.

In addition, it is noted herein that method 100 may allow for automatic correlation (or auto-correlation between a multitude of PWG metrics (e.g., tens, hundreds, or the like) and inline wafer characterization data (e.g., defectivity, metrology, or the like)) for semiconductor device die failure, which may provide insight into the one or more root causes of the inline wafer characterization data and predict device die failure prior to end probe testing. For example, the automatic correlation may predict semiconductor device die failure days or weeks ahead of the end probe testing.

Further, it is noted herein that the method 100 may allow for automatic ranking of geometry features based on correlation to semiconductor device die failure. Further, it is noted herein that the method 100 may allow for automatic generation of a composite geometry metric based on a subset of geometry metrics that meet a select ranking to achieve an improved, more robust correlation to the semiconductor device die failure. For example, the improved, more robust correlation may allow for the monitoring of fewer geometry metrics and may result in increased fabrication productivity.

As such, the method 100 may reduce cost and cycle time while improving a semiconductor device yield by providing a heightened confidence regarding whether a particular semiconductor device die includes a failure at multiple stages during the semiconductor device production process.

Figure 4:
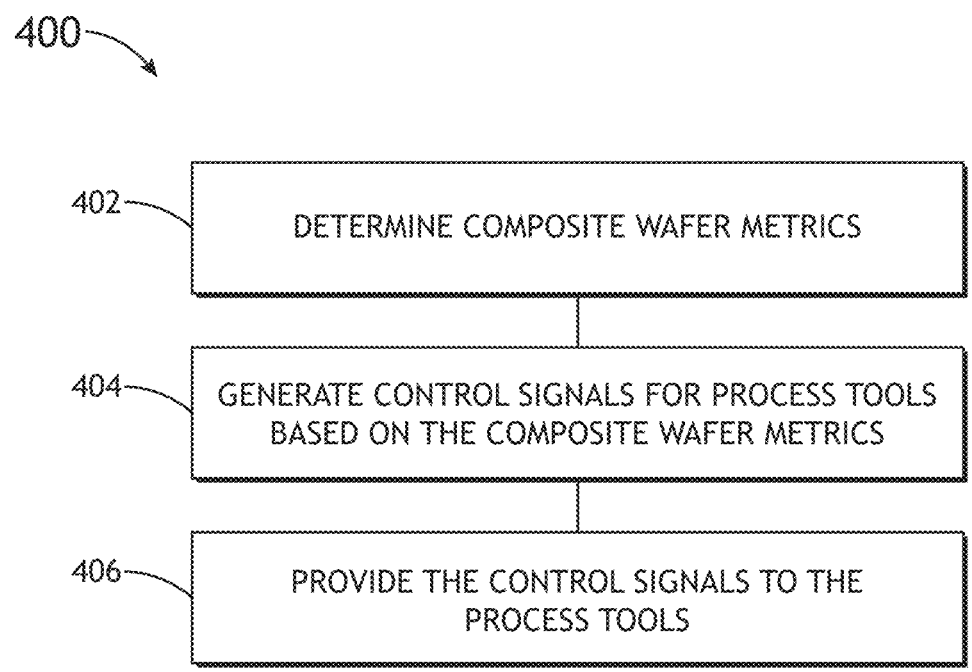
FIG. 4 illustrates a flow diagram of a method for auto-correlation of wafer characterization data and generation of composite wafer metrics during semiconductor device fabrication, in accordance with one or more embodiments of the present disclosure.

FIG. 4 illustrates a flow diagram of a method 400 for auto-correlation of wafer characterization data and generation of composite wafer metrics during semiconductor device fabrication, in accordance with one or more embodiments of the present disclosure.

In a step 402, one or more composite wafer metrics are determined. In one embodiment, the one or more composite wafer metrics are generated via one or more steps of the method 100.

In a step 404, one or more control signals are generated for one or more process tools based on the one or more composite wafer metrics. In one embodiment, the one or more control signals improve performance of a semiconductor fabrication process by adjusting a process tool responsible for a semiconductor device die failure correlated to the one or more composite wafer metrics.

In a step 406, the one or more control signals are provided to the one or more process tools. In one embodiment, the one or more control signals may be provided to a process tool via a feedback loop (e.g., to a process tool positioned within the fabrication process line before the characterization tool) to prevent the semiconductor device die failure on subsequent wafers. In another embodiment, the one or more control signals may be provided to a process tool via a feed-forward loop (e.g., to a process tool positioned within the fabrication process line after the characterization tool) to compensate for the potential semiconductor device die failure on the same semiconductor wafer.

It is noted herein the method 100 and/or the method 400 are not limited to the steps provided. For example, the method 100 and/or the method 400 may instead include more or fewer steps. By way of another example, the method 100 and/or the method 400 may perform the steps in an order other than provided. Therefore, the above description should not be interpreted as a limitation on the scope of the present disclosure, but merely an illustration.

Figure 5A:
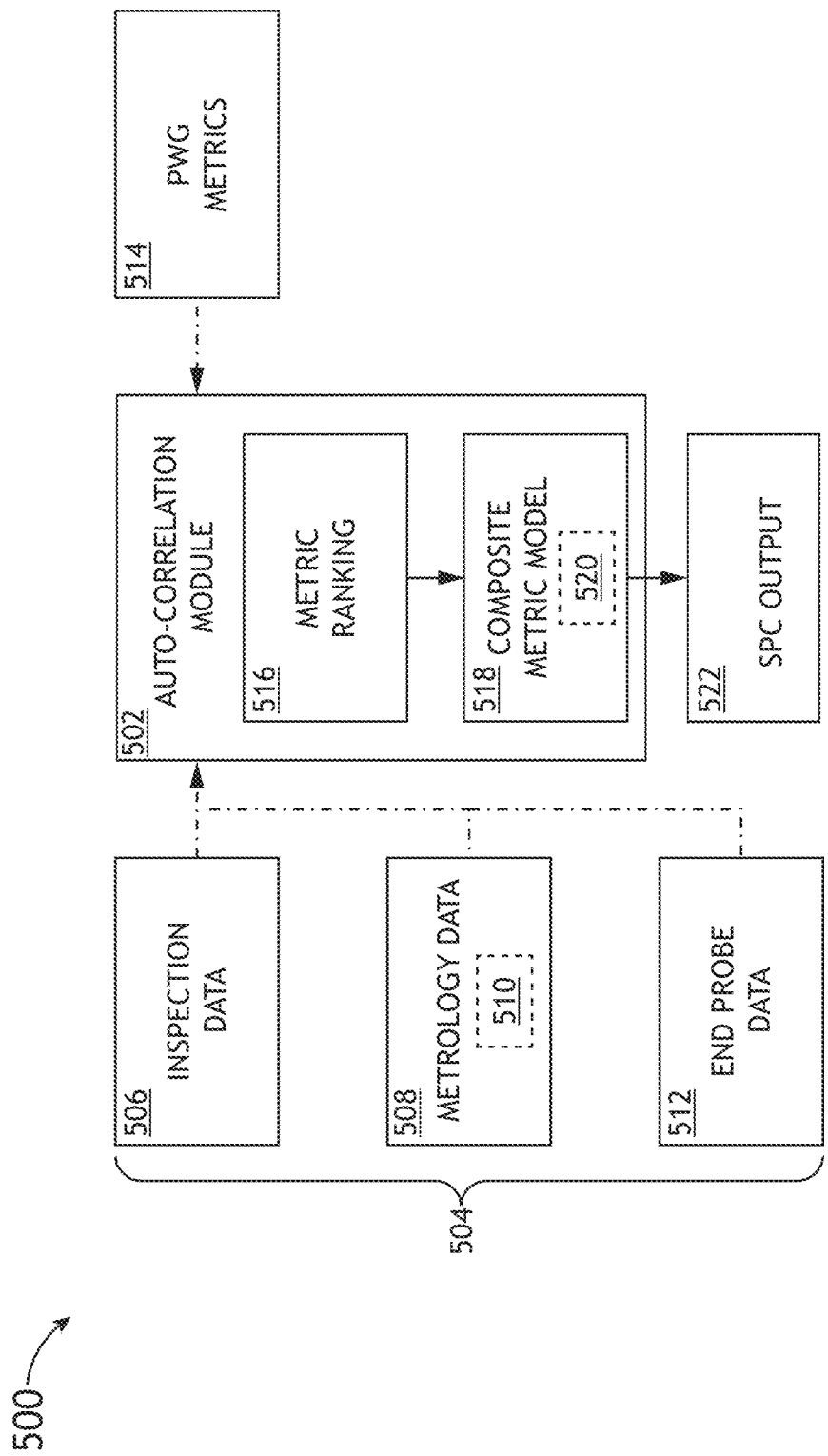
FIG. 5A illustrates a simplified block diagram of a system for auto-correlation of wafer characterization data and generation of composite wafer metrics, in accordance with one or more embodiments of the present disclosure.
Figure 5B:
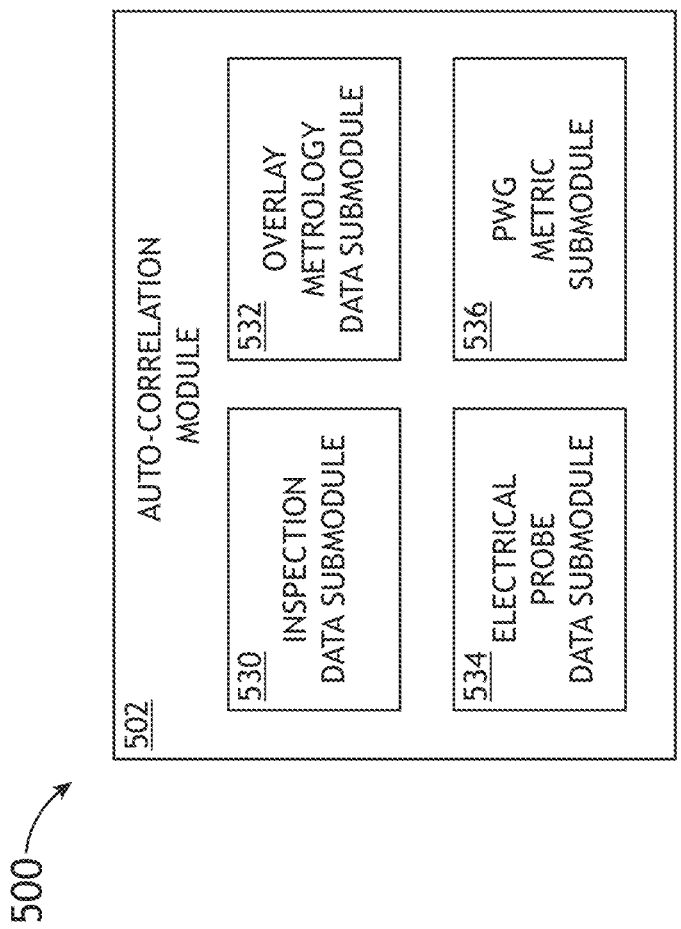
FIG. 5B illustrates a simplified block diagram of a system for auto-correlation of wafer characterization data and generation of composite wafer metrics, in accordance with one or more embodiments of the present disclosure.

FIGS. 5A and 5B generally illustrate a subsystem 500 for auto-correlation of wafer characterization data and generation of composite wafer metrics, in accordance with one or more embodiments of the present disclosure.

In one embodiment, the subsystem 500 includes an auto-correlation module 502. In another embodiment, the auto-correlation module 502 receives one or more data inputs. In another embodiment, the one or more data inputs includes wafer characterization data 504. For example, the wafer characterization data 504 may include, but is not limited to, wafer inspection data 506, wafer metrology data 508, electrical probe or end probe data 512, or the like. For instance, the metrology data 508 may include inline metrology data 510 (e.g., defectivity data, overlay data, or the like). By way of another example, the wafer characterization data 504 is received from one or more wafer characterization tools. In another embodiment, the one or more data inputs includes one or more PWG metrics 514. It is noted herein that the wafer characterization data 504 and/or the one or more PWG metrics 514 may be received from manufacturers of semiconductor devices implementing the subsystem 500 and/or provided by manufacturers of the subsystem 500.

In another embodiment, the auto-correlation module 502 implements one or more machine learning algorithms to generate a ranking 516 comparing the semiconductor device die failure with the one or more PWG metrics 514. For example, the ranking 516 may be based on a determined correlation coefficient. For instance, the correlation coefficient may be an $R^2$—value. By way of another example, as illustrated in FIG. 5B, the auto-correlation module 502 may include one or more submodules for use by and/or with the machine learning algorithm. For instance, the auto-correlation module 502 may include a submodule 530 for analyzing inspection data 506, a submodule 532 for analyzing metrology data 508 (e.g., inline metrology data, overlay metrology data, or the like), a submodule 534 for analyzing electrical probe or end probe data 512, and/or a submodule 536 for analyzing PWG metrics 514.

In another embodiment, the auto-correlation module 502 generates a composite metric model 518 from a subset of the one or more PWG metrics 514. For example, the selection of the subset of the one or more PWG metrics 514 may be based on the ranking 516. In another embodiment, the composite metric model 518 generates one or more composite wafer metrics 520 from the subset of the one or more PWG metrics 514. In this regard, the one or more composite wafer metrics 520 has a greater correlation to the semiconductor device die failure than any of the one or more PWG metrics 514 individually.

In another embodiment, the one or more composite wafer metrics 520 may be output in one or more statistical process control (SPC) datasets or charts 522. In another embodiment, the SPC datasets 522 are monitored for process control. In another embodiment, one or more control signals for one or more process tools based on the one or more composite wafer metrics 520 and/or the one or more SPC datasets 522 are generated. In another embodiment, the one or more control signals are provided to the one or more process tools.

Figure 6:
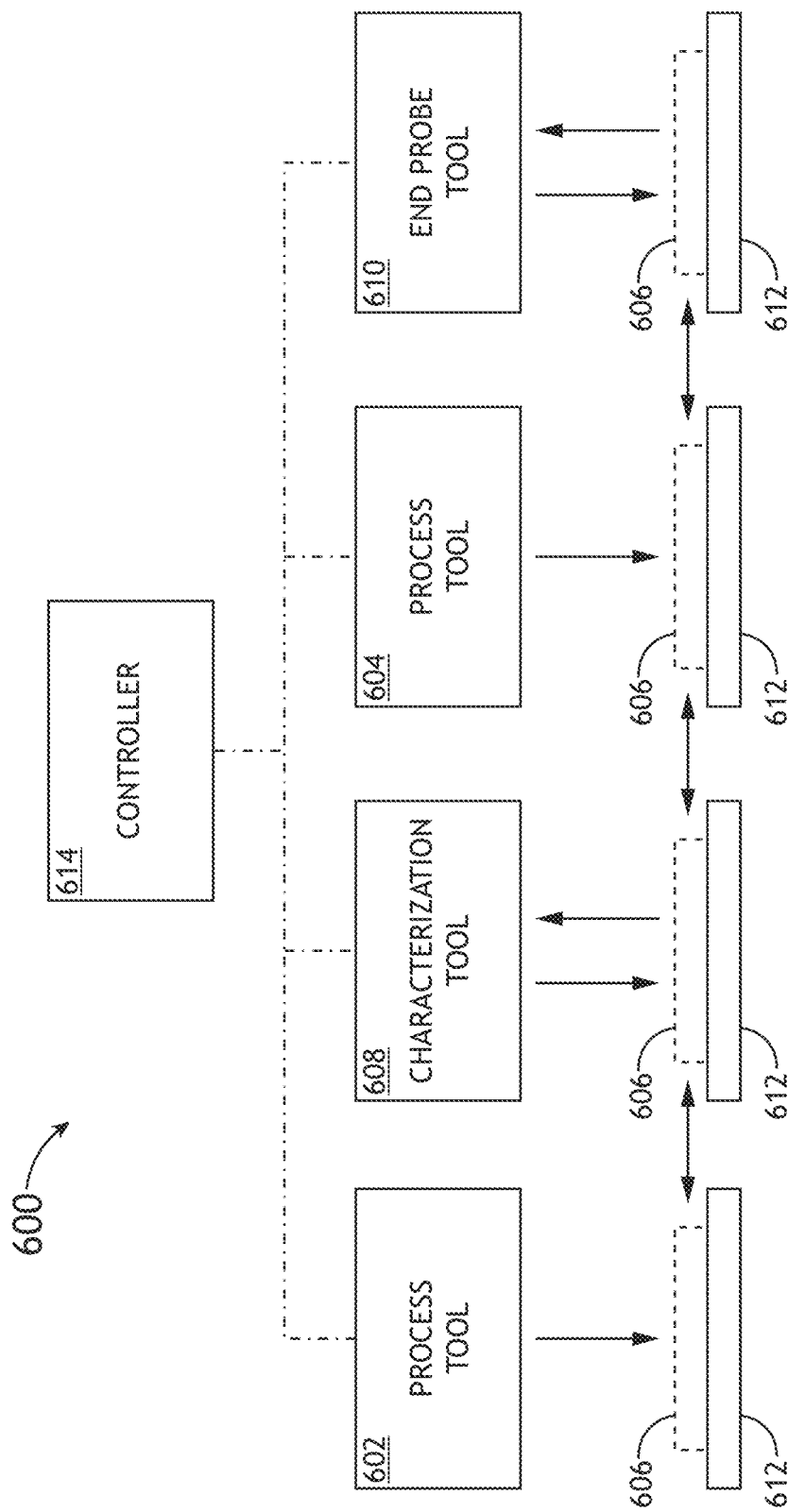
FIG. 6 illustrates a simplified block diagram of a system for auto-correlation of wafer characterization data and generation of composite wafer metrics, in accordance with one or more embodiments of the present disclosure.
Figure 7:
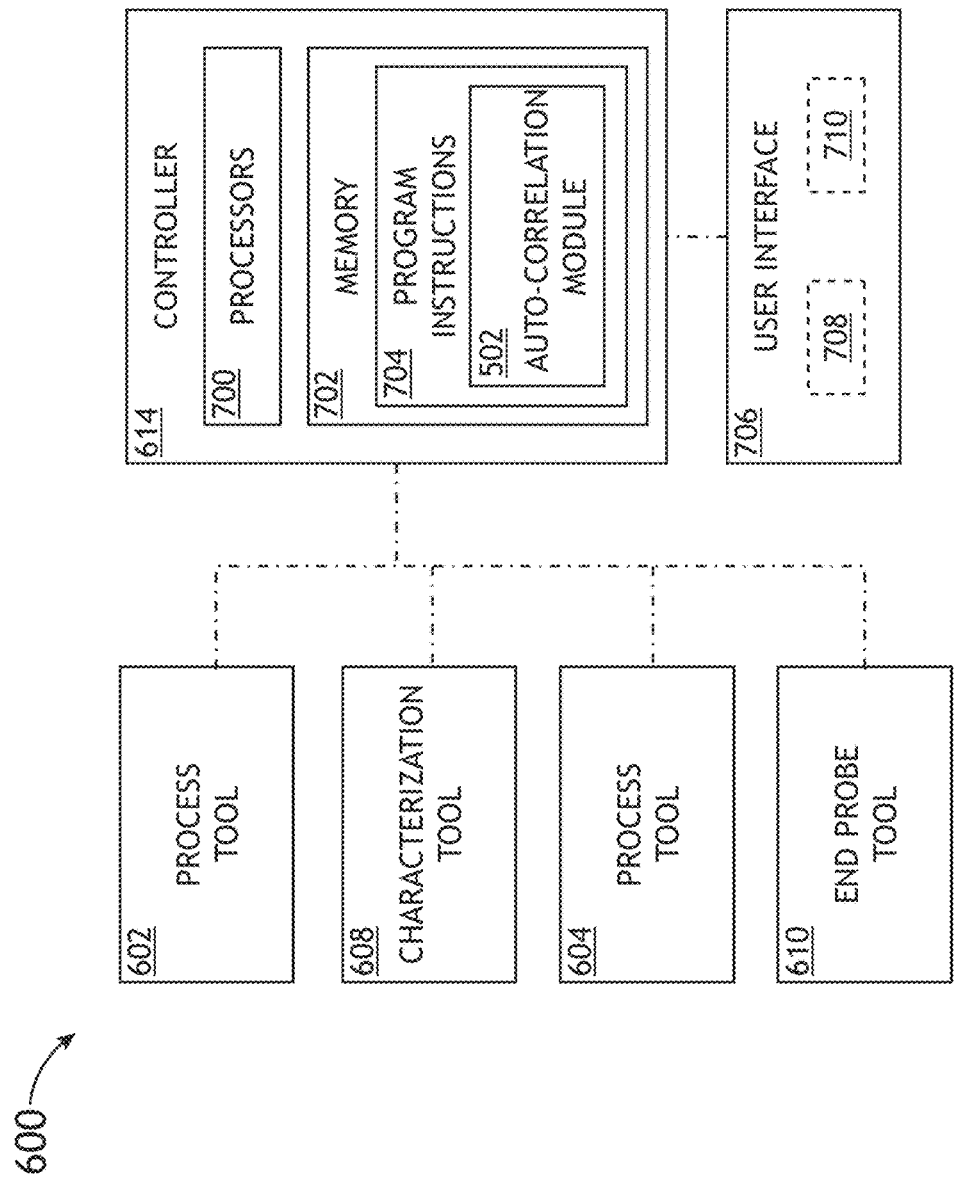
FIG. 7 illustrates a simplified block diagram of a system for auto-correlation of wafer characterization data and generation of composite wafer metrics during semiconductor device fabrication, in accordance with one or more embodiments of the present disclosure.

FIGS. 6 and 7 generally illustrate systems for auto-correlation of wafer characterization data and generation of composite wafer metrics during semiconductor device fabrication, in accordance with one or more embodiments of the present disclosure.

FIG. 6 illustrates a simplified block diagram of a system 600 for auto-correlation of wafer characterization data and generation of composite wafer metrics during semiconductor device fabrication, in accordance with one or more embodiments of the present disclosure.

In one embodiment, the system 600 is configured to perform one or more semiconductor production processes. In another embodiment, the one or more semiconductor production processes include one or more semiconductor fabrication processes. For example, the one or more semiconductor fabrication processes may include, but are not limited to, one or more lithographic processes such as substrate preparation, spin coating, pre-bake processes, exposure processes, post-exposure baking processes, development processes, post-bake processes, or the like. For instance, the one or more lithographic processes may include, but are not limited to, patterning processes, etching processes, stripping processes, annealing processes, chemical mechanical planarization (CMP) processes, or the like. By way of another example, the one or more semiconductor fabrication processes may include, but are not limited to, one or more film deposition processes. For example, the one or more film deposition processes may include, but are not limited to, chemical vapor deposition (CVD) processes, physical vapor deposition (PVD) processes, or the like.

In another embodiment, the system 600 includes one or more process tools 602 and 604 configured to perform the one or more semiconductor fabrication processes. In another embodiment, the one or more process tools 602 and 604 include one or more lithography process tools. For example, the one or more lithography process tools may include, but are not limited to, patterning tools, etching tools, semiconductor doping tools, or the like. Generally, the one or more lithography process tools may include any lithography process tool known in the art. Therefore, the above description should not be interpreted as a limitation on the scope of the present disclosure, but merely an illustration.

In another embodiment, the one or more process tools 602 and 604 include one or more film deposition tools. For example, the one or more film deposition tools may deposit one or more films to form one or more layers on a sample 606. For instance, a layer may include one or more films fabricated by a set of semiconductor production processes that begins with the patterning of an intended design and ends immediately before the patterning of the next design for the next layer. In another embodiment, the one or more films are deposited based on an operating recipe. For example, the one or more films may be deposited on a front side of the sample 606 (e.g., frontside film), a back side of the sample 606 (e.g., a backside film), and/or on a layer previously deposited on the sample 606.

In another embodiment, the sample 606 includes any sample suitable for characterization (e.g., inspection, review, imaging overlay, or the like). For example, the sample 606 may include, but is not limited to, a photomask/reticle, semiconductor device, semiconductor wafer, or the like. As used through the present disclosure, the term "wafer" refers to a substrate formed of a semiconductor and/or a non-semiconductor material. For instance, in the case of a semiconductor material, the wafer may be formed from, but is not limited to, monocrystalline silicon, gallium arsenide, and/or indium phosphide. As such, the term "wafer" and the term "sample" may be used interchangeably in the present disclosure. Therefore, the above description should not be interpreted as a limitation on the scope of the present disclosure but merely an illustration.

It is noted herein that many different types of devices may be formed on a wafer, and the term wafer as used herein is intended to encompass a wafer on which any type of device known in the art is being fabricated. Therefore, the above description should not be interpreted as a limitation on the scope of the present disclosure but merely an illustration.

In another embodiment, the one or more semiconductor production processes includes one or more semiconductor characterization processes. For example, the one or more semiconductor characterization processes may be performed before, between, and/or following the one or more semiconductor production processes. By way of another example, the one or more semiconductor characterization processes may include one or more metrology processes. By way of another example, the one or more semiconductor characterization processes may include one or more inspection processes.

In another embodiment, the system 600 includes one or more inline characterization tools 608 configured to perform the one or more semiconductor characterization processes at one or more times during the production process. For example, the one or more inline characterization tools 608 may perform the one or more semiconductor characterization processes before, between, and/or following the one or more semiconductor fabrication processes.

In another embodiment, the one or more inline characterization tools 608 include one or more metrology tools configured to measure one or more spatial characteristics of the sample 606. For example, the one or more metrology tools may include, but are not limited to, one or more wafer geometry (WG) tools or patterned wafer geometry (PWG) tools (e.g., an interferometer). By way of another example, the one or more spatial characteristics may include, but are not limited to, height (e.g., frontside height or backside height), thickness variation, flatness, and derivatives such as shape, shape-difference, wall pitch, or the like. It is noted herein the one or more spatial characteristics of the sample 606 may be related to the wafer geometry of the sample 606. In addition, it is noted herein that the one or more inline characterization tools 608 may be adapted to characterize patterned wafer geometry on the sample 606, whereby the dynamic range of the sample 606 slope (e.g., wafer slope) measured by the PWG-based characterization tools is extended by stitching measurement results of different regions of the sample 606 together.

In another embodiment, the one or more inline characterization tools 608 include one or more inspection tools. For example, the one or more inspection tools may include, but are not limited to, an optical characterization tool. For instance, the optical characterization tool may include an optical characterization tool capable of generating one or more high-resolution images representing the electrical intent of the sample 606 and capable of operating at a wavelength corresponding to, but not limited to, visible light, UV radiation, DUV radiation, VUV radiation, EUV radiation, and/or X-ray radiation. In addition, the optical characterization tool may include a broadband inspection tool including, but not limited to, a laser sustained plasma (LSP) based inspection tool. Further, the optical characterization tool may include a narrowband characterization tool, such as, but not limited to, a laser scanning inspection tool.

Generally, the one or more inline characterization tools 608 may include any review tool, imaging-based overlay metrology tool, or similar tool known in the art suitable for inspecting one or more wafers, reticles, or photomasks.

In another embodiment, the system 600 includes one or more end probe (or electrical probe) tools 610. For example, the one or more end probe tools 610 may characterize the electrical functionality of the sample 606 after all semiconductor fabrication processes. It is noted herein, however, that the one or more end probe tools 610 may characterize the electrical functionality of the sample 606 between semiconductor fabrication processes (e.g., inline) and/or before any semiconductor fabrication processes. Therefore, the above description should not be interpreted as a limitation on the scope of the present disclosure, but merely an illustration.

In another embodiment, the sample 606 is transferred between the one or more process tools 602 and 604, the one or more inline characterization tools 608, and the one or more end probe tools 610 during the semiconductor production process.

In another embodiment, the determined semiconductor device die failure caused by one or more semiconductor fabrication processes may be prevented in subsequent fabrication processes on subsequent samples 606 (e.g., in a feedback loop). For example, the one or more process tools 602 may be adjustable in a feedback loop based on the determined semiconductor device die failure caused by the one or more semiconductor fabrication processes. In another embodiment, the determined semiconductor device die failure caused by the one or more semiconductor fabrication processes may be compensated for in subsequent fabrication processes on the same sample 606 (e.g., in a feed forward loop). For example, the one or more process tools 604 may be adjustable in the feedback loop based on the determined semiconductor device die failure caused by the one or more semiconductor fabrication processes.

In another embodiment, the sample 606 is secured via a sample stage 612 proximate to the process tools 602 and 604, the inline characterization tools 608, and/or the end probe tools 610. For example, the process tools 602 and 604, the inline characterization tools 608, and/or the end probe tools 610 may each have a separate sample stage 612. By way of another example, one or more of the process tools 602 and 604, the inline characterization tools 608, and/or the end probe tools 610 may share a common sample stage 612.

The sample stage 612 may include any appropriate mechanical and/or robotic assembly known in the art of semiconductor characterization. For example, the sample stage 612 may be configured to secure the sample 606 via contact with at least a portion of a frontside surface and/or a backside surface of the sample 606. For instance, the sample stage 612 may include, but is not limited to, a platform. By way of another example, the sample stage 612 may be configured to secure the sample 606 via contact with a thickness surface and/or an edge of the sample 606. For instance, the sample stage 612 may include, but is not limited to, one or more point contact devices.

The sample stage 612 may include an actuatable stage. For example, the sample stage 612 may include, but is not limited to, one or more translational stages suitable for selectively translating the sample 606 along one or more linear directions (e.g., x-direction, y-direction, and/or z-direction). By way of another example, the sample stage 612 may include, but is not limited to, one or more rotational stages suitable for selectively rotating the sample 606 along a rotational direction. By way of another example, the sample stage 612 may include, but is not limited to, one or more rotational stages and translational stages suitable for selectively translating the sample 606 along a linear direction and/or rotating the sample 606 along a rotational direction. By way of another example, the sample stage 612 may be configured to translate or rotate the sample 606 for positioning, focusing, and/or scanning in accordance with a selected characterization process (e.g., review, imaging overlay, or the like), several of which are known to the art.

In one embodiment, the system 600 includes a controller 614. For example, the controller 614 may be communicatively coupled to the one or more process tools 602 and 604 by a transmission medium that may include wireline and/or wireless portions. By way of another example, the controller 614 may be communicatively coupled to one or more tools of the one or more inline characterization tools 608 by a transmission medium that may include wireline and/or wireless portions.

FIG. 7 illustrates a simplified block diagram of a system 600 for process-induced excursion characterization of the semiconductor wafer 606, in accordance with one or more embodiments of the present disclosure.

In one embodiment, the controller 614 includes one or more processors 700 and/or memory 702. In another embodiment, the memory 702 stores one or more sets of program instructions 704. In another embodiment, a user interface 706 is communicatively coupled to and/or integrated with the controller 614. For example, the controller 614 may be coupled to the user interface 706 via a transmission medium that may include wireline and/or wireless portions. In another embodiment, the user interface 706 includes one or more display devices 708 and/or one or more user input devices 710. In another embodiment, the one or more display devices 708 are coupled to the one or more user input devices 710. For example, the one or more display devices 708 may be coupled to the one or more user input devices 710 by a transmission medium that may include wireline and/or wireless portions.

The controller 614 may be configured to receive and/or acquire data or information from other systems or subsystems (e.g., one or more sets of information from the one or more process tools 602 and 604, the one or more inline characterization tools 608, the one or more end probe tools 610, the user interface 706, or the like) of the system 600 via a transmission medium that may include wireline and/or wireless portions. The controller 614 may in addition be configured to transmit data or information (e.g., the output of one or more procedures of the inventive concepts disclosed herein) to one or more systems or sub-systems (e.g., one or more sets of information from the one or more process tools 602 and 604, the one or more inline characterization tools 608, the one or more end probe tools 610, the user interface 706, or the like) of the system 600 by a transmission medium that may include wireline and/or wireless portions. In this regard, the transmission medium may serve as a data link between the controller 614 and the other subsystems of the system 600. In addition, the controller 614 may be configured to send data to external systems via a transmission medium (e.g., network connection).

The one or more processors 700 may include any one or more processing elements known in the art. In this sense, the one or more processors 700 may include any microprocessor device configured to execute algorithms and/or program instructions 704. For example, the one or more processors 700 may consist of a desktop computer, mainframe computer system, workstation, image computer, parallel processor, handheld computer (e.g., tablet, smartphone, or phablet), or another computer system (e.g., networked computer). In general, the term "processor" may be broadly defined to encompass any device having one or more processing elements, which execute the one or sets of program instructions 704 from a non-transitory memory medium (e.g., the memory 702). Moreover, different subsystems of the system 600 (e.g., one or more sets of information from the one or more process tools 602 and 604, the one or more inline characterization tools 608, the one or more end probe tools 610, the user interface 706, or the like) may include processor or logic elements suitable for carrying out at least a portion of the steps described throughout the present disclosure. Therefore, the above description should not be interpreted as a limitation on the present disclosure but merely an illustration.

The memory 702 may include any storage medium known in the art suitable for storing the one or more sets of program instructions 704 executable by the associated one or more processors 700. For example, the memory 702 may include a non-transitory memory medium. For instance, the memory 702 may include, but is not limited to, a read-only memory, a random access memory, a magnetic or optical memory device (e.g., disk), a magnetic tape, a solid state drive, and the like. The memory 702 may be configured to provide display information to a display device 708 of the user interface 706. The memory 702 may in addition be configured to store user input information from a user input device 710 of the user interface 706. The memory 702 may be housed in a common controller 614 housing with the one or more processors 700. The memory 702 may, alternatively or in addition, be located remotely with respect to the spatial location of the processors 700 and/or the controller 614. For instance, the one or more processors 700 and/or the controller 614 may access a remote memory 702 (e.g., server), accessible through a network (e.g., internet, intranet, and the like).

In another embodiment, the controller 614 executes one or more semiconductor fabrication processes, one or more semiconductor characterization processes, one or more modelling processes, and/or one or more system analysis processes from program instructions 704 stored on memory 702 via the one or more processors 700. For example, the one or more program instructions 704 may embody or include the auto-correlation module 502. For instance, the auto-correlation module 502 may be configured to cause the one or more processors 700 to receive one or more pattern wafer geometry (PWG) metrics, receive wafer characterization data, determine correlation between the one or more PWG metrics and the wafer characterization data, generate a ranking of the PWG metrics based on the correlation, construct a composite metric model from a subset of the PWG metrics based on the ranking, generate one or more composite wafer metrics from the composite metric model, and/or generate one or more statistical process control outputs based on the one or more composite wafer metrics. For instance, the wafer characterization data may be received from the one or more inline characterization tools 608 and/or the one or more end probe tools 610. By way of another example, the one or more program instructions 704 may be configured to cause the one or more processors 700 to generate one or more control signals based on the one or more composite wafer metrics and/or provide the one or more control signals to the process tools 602 and 604. Generally, the one or more sets of program instructions 704 may be configured to cause the one or more processors 700 to carry out any steps of the one or more methods (e.g., method 100 and/or method 400) described throughout the present disclosure.

Although embodiments of the present disclosure illustrate the controller 614 as a stand-alone component from the one or more process tools 602 and 604 and/or from the one or more inline characterization tools 608, it is noted herein that any fabrication processes, characterization processes, modelling processes, and/or system analysis processes for determining spatial characteristics of samples 606 may be implemented via a controller integrated within the one or more process tools 602 and 604, within one or more tools of the one or more inline characterization tools 608, and/or within the one or more end probe tools 610. Therefore, the above description should not be interpreted as a limitation on the scope of the present disclosure but merely an illustration.

The one or more display devices 708 may include any display device known in the art. For example, the one or more display devices 708 may include, but are not limited to, a liquid crystal display (LCD). By way of another example, the one or more display devices 708 may include, but are not limited to, an organic light-emitting diode (OLED) based display. By way of another example, the one or more display devices 708 may include, but are not limited to a CRT display. Those skilled in the art should recognize that a variety of display devices may be suitable for implementation in the present invention and the particular choice of display device may depend on a variety of factors, including, but not limited to, form factor, cost, and the like. Generally, any display device capable of integration with a user input device (e.g., touchscreen, bezel mounted interface, keyboard, mouse, trackpad, and the like) is suitable for implementation in the present invention.

The one or more user input devices 710 may include any user input device known in the art. For example, the one or more user input devices 710 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 708 may be integrated with a touchscreen interface, such as, but not limited to, a capacitive touchscreen, a resistive touchscreen, a surface acoustic based touchscreen, an infrared based touchscreen, or the like. Generally, any touchscreen interface capable of integration with the display portion of a display device is suitable for implementation in the present invention. In another embodiment, the one or more user input devices 710 may include, but are not limited to, a bezel mounted interface.

Although embodiments of the present disclosure describe the one or more process tools 602 and 604, the one or more inline characterization tools 608, and/or the one or more end probe tools 610 as components of the system 600, it is noted herein that the one or more process tools 602 and 604, the one or more inline characterization tools 608, and/or the one or more end probe tools 610 may not be integral or required components of the system 600. For example, the one or more process tools 602 and 604, the one or more inline characterization tools 608, and/or the one or more end probe tools 610 may be components separate from and communicatively coupled to the system 600 via an intermediate source (e.g., the controller 614, a server, or the like). Therefore, the above description should not be interpreted as a limitation on the scope of the present disclosure but merely an illustration.

Although embodiments of the present disclosure describe the controller 614 as a component of the system 600, it is noted herein that the controller 614 may not be an integral or required component of the system 600. In addition, while embodiments of the present disclosure describe the user interface 706 as a component of the system 600, it is noted herein that the user interface 706 may not be an integral or required component of the system 600. Therefore, the above description should not be interpreted as a limitation on the scope of the present disclosure but merely an illustration.

Advantages of the present disclosure include auto-correlation of wafer characterization data and generation of composite wafer metrics during semiconductor device fabrication. Advantages of the present disclosure also include classification processes for metric ranking-based auto-correlation. Advantages of the present disclosure also include generating composite metrics for greater correlation between semiconductor device die failure and geometry features. Advantages of the present disclosure also include implementing the generated rankings and composite metrics for end probe and inline semiconductor characterization processes.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively, or in addition, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively, or in addition, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C, C++, python, Ruby on Rails, Java, PHP, .NET, or Node.js programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, or the like; and a transmission type medium such as a digital and/or an analog communication medium (e.g., a fiber optic cable, a waveguide, a wired communications link, a wireless communication link (e.g., transmitter, receiver, transmission logic, reception logic, or the like), or the like).

Generally, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), or the like), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, or the like)), electrical circuitry forming a communications device (e.g., a modem, communications switch, optical-electrical equipment, or the like), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Generally, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, or the like)), and/or electrical circuitry forming a communications device (e.g., a modem, communications switch, optical-electrical equipment, or the like). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, or the like), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," or the like Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," or the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, or the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, or the like). In those instances where a convention analogous to "at least one of A, B, or C, or the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, or the like). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A system, comprising:
   a controller, wherein the controller includes one or more processors and memory configured to store one or more sets of program instructions, wherein the one or more sets of program instructions are configured to cause the one or more processors to:
     receive a plurality of patterned wafer geometry metrics for a wafer, wherein the plurality of patterned wafer geometry metrics includes at least two different patterned wafer geometry metrics;
     receive wafer characterization data for the wafer from one or more characterization tools;
     determine a correlation between the plurality of patterned wafer geometry metrics and the wafer characterization data with respect to die failure of the wafer;
     generate an automatic ranking of the plurality of patterned wafer geometry metrics based on the determined correlation via at least one machine learning algorithm;
     construct a composite metric model for the wafer from a subset of the plurality of patterned wafer geometry metrics based on the automatic ranking of the plurality of patterned wafer geometry metrics, wherein the subset of the plurality of patterned wafer geometry metrics includes a first metric with a highest ranking and at least a second metric with a second-highest ranking;
     generate one or more composite wafer metrics for the wafer from the composite metric model, wherein the one or more composite wafer metrics have a correlation to die failure of the wafer that is greater than the correlation to die failure of the wafer of the plurality of patterned wafer geometry metrics;
     generate a statistical process control output based on the one or more composite wafer metrics; and
     adjust one or more characteristics of one or more process tools based on the statistical process control output to improve one or more fabrication processes.

2. The system of claim 1, wherein the one or more sets of program instructions are further configured to cause the one or more processors to:
   generate one or more correctables based on the one or more composite wafer metrics.

3. The system of claim 2, wherein the one or more sets of program instructions are further configured to cause the one or more processors to:
   provide the one or more correctables to the one or more process tools to improve the one or more fabrication processes.

4. The system of claim 3, wherein the one or more correctables are provided to the one or more process tools via a feedback loop.

5. The system of claim 3, wherein the one or more correctables are provided to the one or more process tools via a feed forward loop.

6. The system of claim 1, wherein the plurality of patterned wafer geometry metrics includes one or more nanotopography (NT) metrics.

7. The system of claim 1, wherein the plurality of patterned wafer geometry metrics includes one or more local shape curvature (LSC) metrics.

8. The system of claim 1, wherein the wafer characterization data includes wafer inspection data.

9. The system of claim 1, wherein the wafer characterization data includes wafer metrology data.

10. The system of claim 9, wherein the wafer metrology data includes inline wafer metrology data.

11. The system of claim 1, wherein the wafer characterization data includes electrical probe data.

12. The system of claim 1, wherein the correlation between the plurality of patterned wafer geometry metrics and the wafer characterization data includes a correlation coefficient, wherein a saturation level of the correlation coefficient is dependent on a number of wafer geometry metrics, wherein a prediction accuracy of the composite wafer metric is dependent on the level of saturation of the correlation coefficient.

13. The system of claim 12, wherein the correlation coefficient is an $R^2$—value.

14. The system of claim 12, wherein the one or more sets of program instructions are further configured to cause the one or more processors to:
   determine the correlation coefficient between the plurality of patterned wafer geometry metrics and the wafer characterization data via the at least one machine learning algorithm.

15. The system of claim 14, wherein the at least one machine learning algorithm includes a classification algorithm.

16. The system of claim 15, wherein the classification algorithm includes logistic regression.

17. The system of claim 15, wherein the classification algorithm includes a decision tree.

18. The system of claim 1, wherein the one or more sets of program instructions are further configured to cause the one or more processors to:
   display the statistical process control output on a user interface coupled to the controller.

19. A system, comprising:
   one or more characterization tools; and a controller, wherein the controller includes one or more processors and memory configured to store one or more sets of program instructions wherein the one or more sets of program instructions are configured to cause the one or more processors to:
receive a plurality of patterned wafer geometry metrics for a wafer, wherein the plurality of patterned wafer geometry metrics includes at least two different patterned wafer geometry metrics;
receive wafer characterization data for the wafer from one or more characterization tools;
determine a correlation between the plurality of patterned wafer geometry metrics and the wafer characterization data with respect to die failure of the wafer;
generate an automatic ranking of the plurality of patterned wafer geometry metrics based on the determined correlation via at least one machine learning algorithm;
construct a composite metric model for the wafer from a subset of the plurality of patterned wafer geometry metrics based on the automatic ranking of the plurality of patterned wafer geometry metrics, wherein the subset of the plurality of patterned wafer geometry metrics includes a first metric with a highest ranking and at least a second metric with a second-highest ranking;
generate one or more composite wafer metrics for the wafer from the composite metric model, wherein the one or more composite wafer metrics have a correlation to die failure of the wafer that is greater than the correlation to die failure of the wafer of the plurality of patterned wafer geometry metrics;
generate a statistical process control output based on the one or more composite wafer metrics; and
adjust one or more characteristics of one or more process tools based on the statistical process control output to improve one or more fabrication processes.

20. A method comprising:
receiving a plurality of patterned wafer geometry metrics for a wafer, wherein the plurality of patterned wafer geometry metrics includes at least two different patterned wafer geometry metrics;
receiving wafer characterization data for the wafer from one or more characterization tools;
determining a correlation between the plurality of patterned wafer geometry metrics and the wafer characterization data with respect to die failure of the wafer;
generating an automatic ranking of the plurality of patterned wafer geometry metrics based on the determined correlation via at least one machine learning algorithm;
constructing a composite metric model for the wafer from a subset of the plurality of patterned wafer geometry metrics based on the automatic ranking of the plurality of patterned wafer geometry metrics, wherein the subset of the plurality of patterned wafer geometry metrics includes a first metric with a highest ranking and at least a second metric with a second-highest ranking;
generating one or more composite wafer metrics for the wafer from the composite metric model, wherein the one or more composite wafer metrics have a correlation to die failure of the wafer that is greater than the correlation to die failure of the wafer of the plurality of patterned wafer geometry metrics;
generating a statistical process control output based on the one or more composite wafer metrics; and
adjusting one or more characteristics of one or more process tools based on the statistical process control output to improve one or more fabrication processes.

21. The method of claim 20, further comprising:
generating one or more correctables based on the one or more composite wafer metrics.

22. The method of claim 21, further comprising:
providing the one or more correctables to the one or more process tools to improve the one or more fabrication processes.

23. The method of claim 22, wherein the one or more correctables are provided to the one or more process tools via a feedback loop.

24. The method of claim 22, wherein the one or more correctables are provided to the one or more process tools via a feed forward loop.

25. The method of claim 20, wherein the plurality of patterned wafer geometry metrics includes one or more nanotopography (NT) metrics.

26. The method of claim 20, wherein the plurality of patterned wafer geometry metrics includes one or more local shape curvature (LSC) metrics.

27. The method of claim 20, wherein the wafer characterization data includes wafer inspection data.

28. The method of claim 20, wherein the wafer characterization data includes wafer metrology data.

29. The method of claim 28, wherein the wafer metrology data includes inline wafer metrology data.

30. The method of claim 20, wherein the wafer characterization data includes electrical probe data.

31. The method of claim 20, wherein the correlation between the plurality of patterned wafer geometry metrics and the wafer characterization data includes a correlation coefficient, wherein a saturation level of the correlation coefficient is dependent on a number of wafer geometry metrics, wherein a prediction accuracy of the composite wafer metric is dependent on the level of saturation of the correlation coefficient.

32. The method of claim 31, wherein the correlation coefficient is an $R^2$—value.

33. The method of claim 31, further comprising:
determining the correlation coefficient between the plurality of patterned wafer geometry metrics and the wafer characterization data via the at least one machine learning algorithm.

34. The method of claim 33, wherein the at least one machine learning algorithm includes a classification algorithm.

35. The method of claim 34, wherein the machine learning algorithm includes logistic regression.

36. The method of claim 34, wherein the machine learning algorithm includes a decision tree.

37. The method of claim 20, further comprising:
displaying the statistical process control output on a user interface.

* * * * *